Jan. 9, 1962      P. N. DOTZENROTH      3,015,923

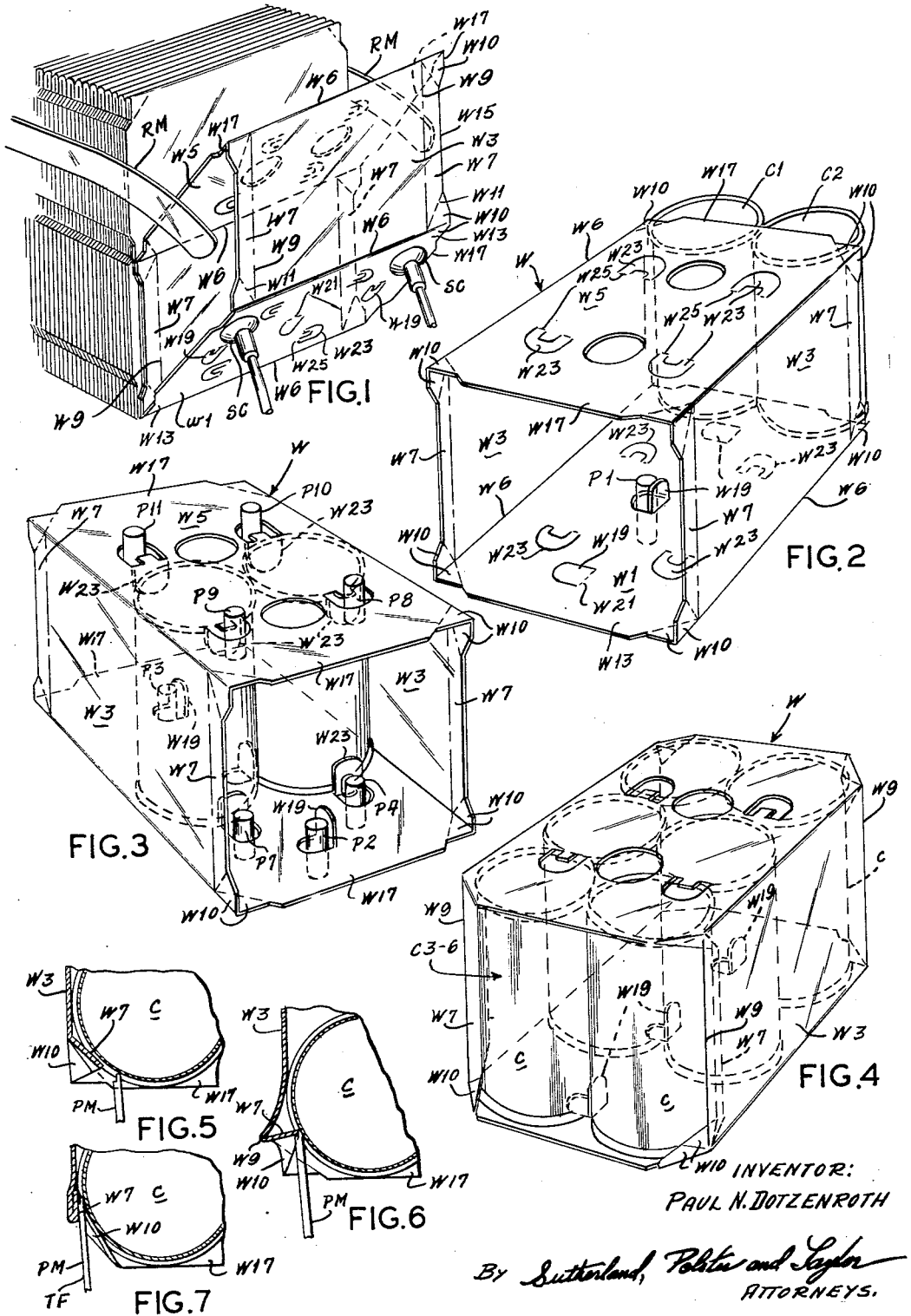

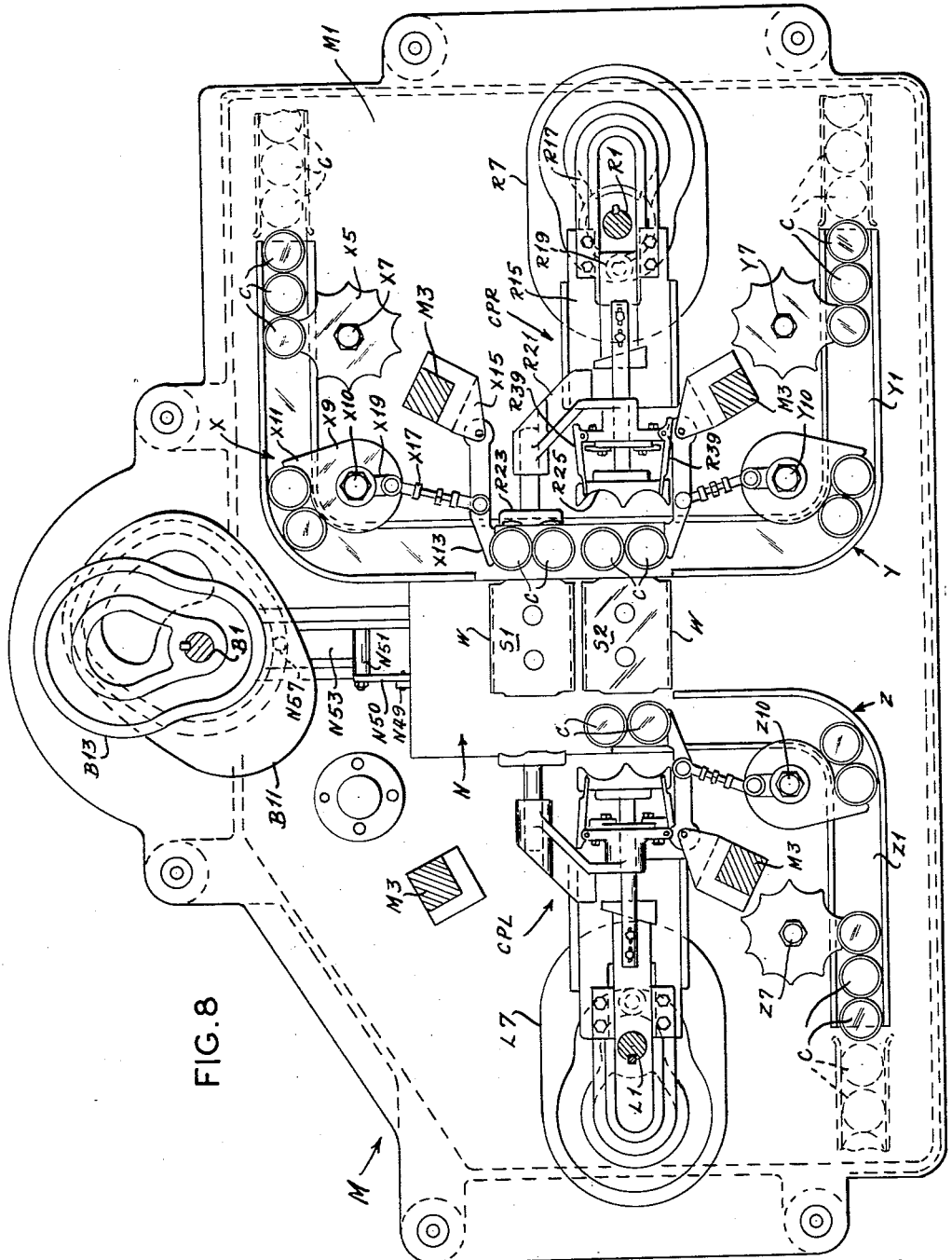

CAN PACK

Filed April 13, 1959      13 Sheets-Sheet 3

INVENTOR:
PAUL N. DOTZENROTH

By Sutherland, Pokster and Taylor
ATTORNEYS.

Jan. 9, 1962 P. N. DOTZENROTH 3,015,923
CAN PACK
Filed April 13, 1959 13 Sheets-Sheet 9

INVENTOR:
PAUL N. DOTZENROTH
By Sutherland, Polster and Taylor
ATTORNEYS.

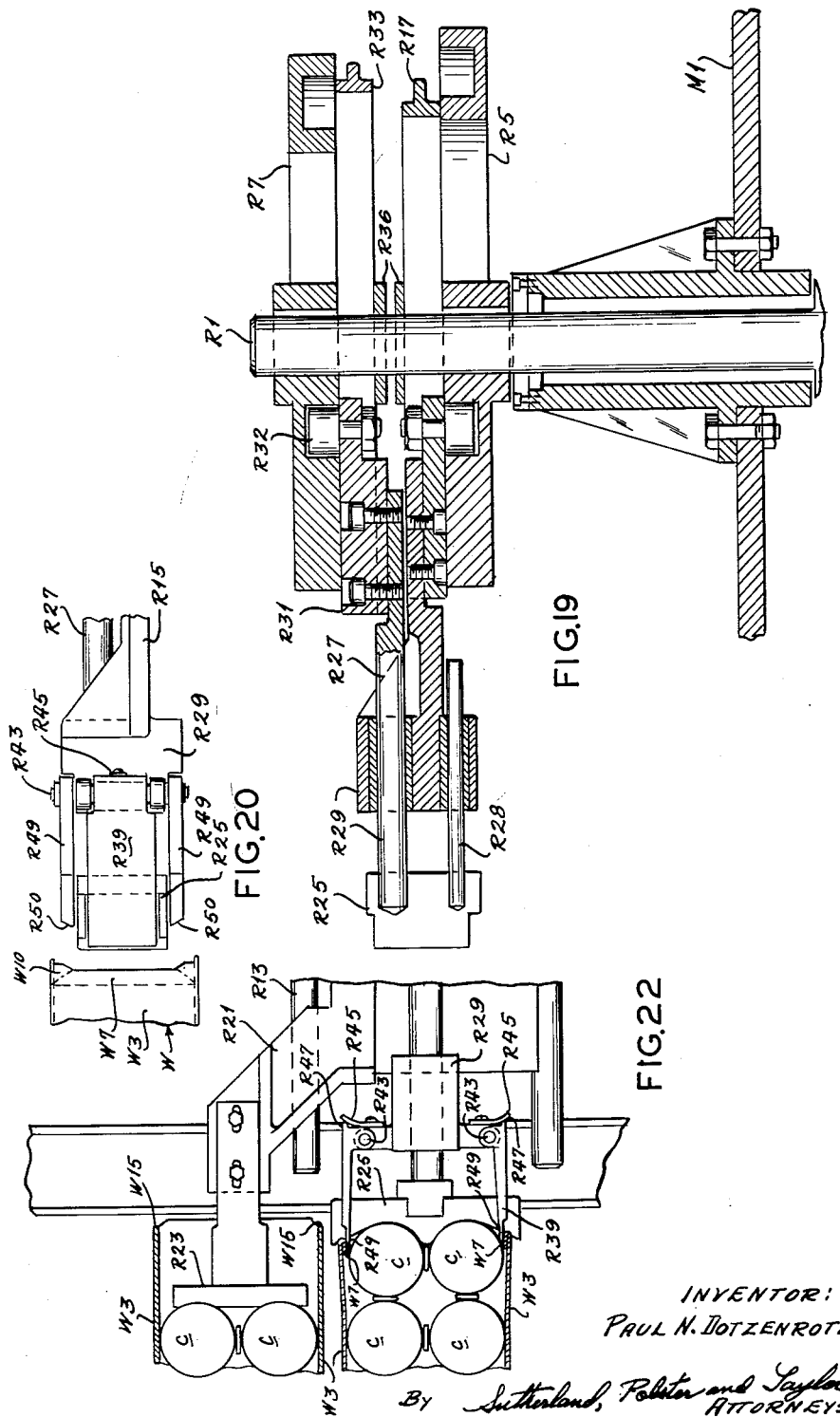

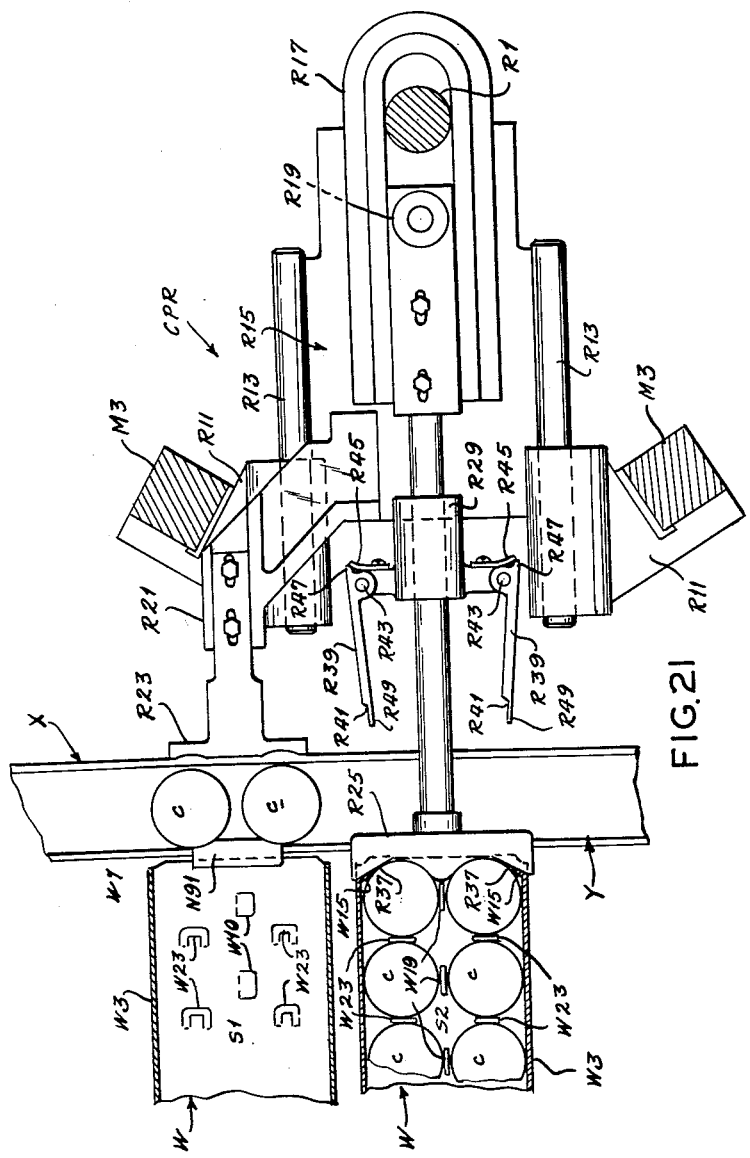

United States Patent Office 3,015,923
Patented Jan. 9, 1962

3,015,923
CAN PACK
Paul N. Dotzenroth, Minneapolis, Minn., assignor to Alton Box Board Company, Alton, Ill., a corporation of Delaware
Filed Apr. 13, 1959, Ser. No. 805,882
8 Claims. (Cl. 53—186)

This invention relates to packaging machines, and more particularly, to machines for packaging a plurality of articles within a wrapper therefor.

It will be understood that it is desirable to merchandise canned products and the like in multiple-article packages in order to provide a conveniently handled unit of merchandise and stimulate sales. For example, six cans of beer may be packaged in a paperboard wrapper. Various paperboard wrappers have been proposed, and while one type has certain attractions as a wrapper, there has been no machine for inserting the articles within the wrapper and closing the wrapper. Such a machine must be capable of a high rate of production so that it can be operated in conjunction with other production equipment, such as a canning line.

Accordingly, the present disclosure is directed to a machine for and process of packaging cans and the like, and more particularly to a machine and process utilizing open-ended sleeve-like wrappers of a certain type. The wrappers are supplied to the machine as collapsed tubes, and the machine is adapted to withdraw a wrapper from a magazine or hopper, open the wrapper, insert the articles and close the wrapper. The invention also contemplates the step of upsetting separator tabs from the bottom or top walls of the wrapper prior to insertion of some of the articles, and of moving the wrapper to one or more stations, at which various operations are performed. While the invention is described with reference to a six-can package, it will be understood that various aspects thereof are applicable to packages of other size, shape and structure. Also, whereas the particular machine is a two-position machine, it will be understood that the invention, in part, is applicable to machines wherein the operations are concluded at one position or wherein the package passes through a number of positions before completion.

Other features of the invention will be in part apparent from and in part pointed out in the following detail description taken in connection with the accompanying drawings, in which:

FIG. 1 is a perspective view showing an initial step performed by the machine of this invention in withdrawing and opening a wrapper from a stack of collapsed wrappers preparatory to the insertion of cans therein;

FIG. 2 is a view similar to that of FIG. 1, but illustrating a next step, wherein a longitudinal separator tab is folded up from the bottom wall preparatory to insertion of a pair of cans;

FIG. 3 is a view similar to that of FIG. 2, but illustrating a next step, wherein other longitudinal and transverse separator tabs are folded preparatory to insertion of four more cans;

FIG. 4 is a perspective view of the finished six-can package with end-retaining members folded inwardly to secure the cans within the wrapper;

FIG. 5 is a detail horizontal section of an end portion of the wrapper with the end can in place and showing an initial step in forming the end closure;

FIG. 6 is a view similar to FIG. 5, but showing a next step in forming the end closure;

FIG. 7 is a view similar to FIG. 6, and showing a further step in completing the end closure;

FIG. 8 is a top plan view of the main base of the machine showing certain moving parts of the can-conveying system, other parts of the machine being omitted in this view;

FIG. 19 is a detail vertical section taken generally on the line 19—19 of FIG. 8, showing the cam-operating mechanism for the right-hand can-pushing and flap-folding devices;

FIG. 20 is a detailed side elevation of the flap-folding and tucking fingers forming part of the mechanism partially shown in FIG. 19;

FIG. 21 is a detail top plan view similar to part of FIG. 8, but showing right-hand can-pusher during an initial step wherein the front can-pusher is actuated to insert a pair of cans at the second wrapper station; and FIG. 22 is a view similar to FIG. 21, but showing a next step in the operation of the can-pushers and flap-folding devices.

Figure 9:
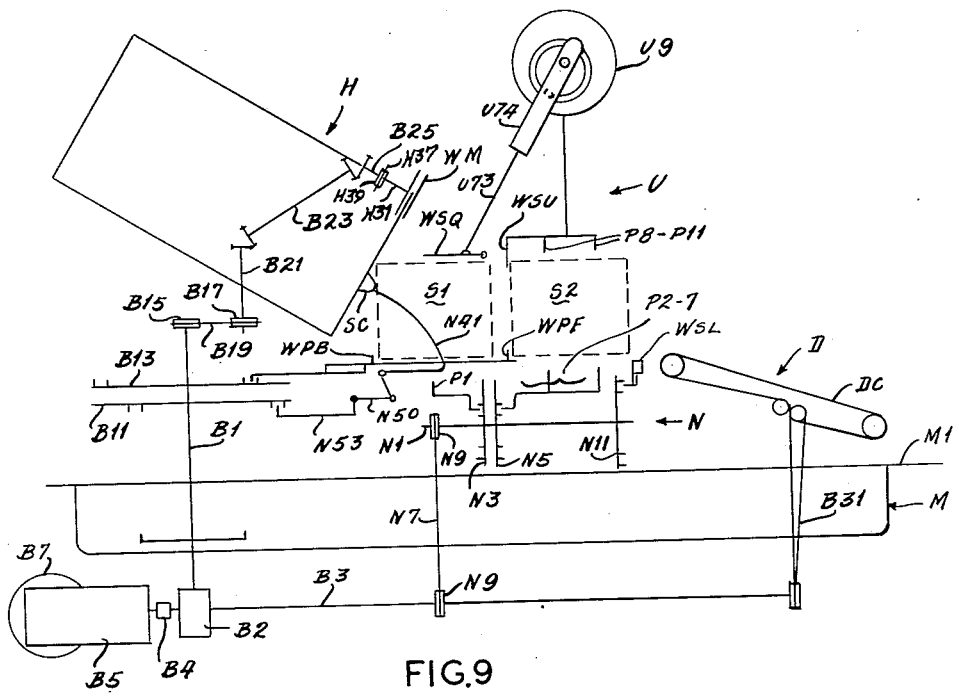
FIG. 9 is a diagrammatic line drawing corresponding in general to a side elevation of the machine and showing certain principal components of the machine by thin line blocks and certain power transmitting operating mechanism by thick lines.

Referring to FIG. 1, the machine and process particularly disclosed are adapted for packaging two rows of three cans per row within an open-ended sleeve-like wrapper having a bottom wall W1, side walls W3 and a top wall W5 foldably connected along scores W6. The wrapper is disclosed in my co-pending application, Serial No. 690,952, filed October 18, 1957, of which this is a continuation-in-part. For example, the sleeve may be formed from a sheet of paperboard with the ends thereof adhesively secured in overlapping relationship, although this is not shown. The end portions of the side walls are foldable as flaps W7 along score lines W9, and these end flaps are connected to corner-retaining sections W10 defined by score lines W11 across the corners of the side walls and by scores W13 across the corners of the top and bottom walls. It will further be noted that the edges W15 of the side walls (or end flaps W7) are offset inwardly with respect to the edges W17 of the top and bottom walls, and also that the top and bottom walls project endwise slightly beyond the corner-retaining sections W10, as illustrated in FIG. 1.

The wrappers are delivered to the machine in collapsed form and are stacked within a hopper or magazine, from which individual wrappers are individually withdrawn. Preferably, the hopper is disposed at an angle and a wrapper is withdrawn by suction cups SC, which grip the bottom wall W1, while retaining members RM engage the ends of the top wall, so that the wrapper is automatically opened to its generally rectangular configuration as the bottom wall is pulled down from the hopper. In the machine herein disclosed, a wrapper is drawn from the hopper to a first wrapper station on a sub-base.

It will further be noted that the wrapper is provided with U-shaped cuts and associated scores in its top and bottom walls, which cuts define a number of separator tabs foldable inwardly along appropriate score lines. The bottom wall includes a row of three longitudinal separator tabs W19 foldable at scores W21, which are aligned with the center of the bottom wall. In addition, both the top and bottom walls have additional transverse separator tabs W23, which are foldable along transverse scores W25 positioned so that the transverse tabs, when folded, act as transverse separators and retaining members for the cans in the two rows within the wrapper.

Referring now to FIG. 2, wherein the wrapper is shown at its first station, the center longitudinal tab W19 in the bottom wall is folded upwardly by a first bottom poker P1 preparatory to the insertion of a first pair of cans C1 and C2 through an open end of the wrapper. The cans are delivered in pairs to a position opposite the open end of the wrapper at its first station by a can conveyor and are pushed as a pair into the center of the wrapper, the poker P1 necessarily being withdrawn as the cans approach the center, whereupon the cans will hold the tab in proper position to act as a longitudinal separator.

The partially filled wrapper is then indexed forwardly on the machine to a second station, as shown in FIG. 3, and the two additional longitudinal separating tabs W19 in the bottom wall are folded upwardly by pokers P2 and P3, and the four transverse separator tabs W23 in each the top and bottom walls are folded inwardly by bottom pokers P4–P7 and upper pokers P8–P11. Pairs of cans C (FIG. 4) are delivered to the opposite ends of the second wrapper station by second and third conveyors, and are then pushed into the partially filled wrapper, the tab pokers being withdrawn as the cans are pushed inwardly.

Referring now to FIGS. 4–7, the cans are then locked within the open ends of the wrapper by folding the side flaps W7 back to engage between the end cans and the side walls W3. Initially, the flaps W7 are bent inwardly on line W9, as indicated in FIG. 5. The initial inward deflection of the flaps may be effected by can pushers. A plow member PM having a notched end portion, as shown in FIG. 6, is then advanced toward each end can so as to engage the cylindric wall thereof and be guided thereby toward the end of the adjacent side flap W7. As the notched end of the plow moves about the wall of the can, the edge of the flap W7 is caught and is carried by the plow inwardly between the can and the side wall W3, thereby causing the top and bottom corner portions W10 to fold about their score lines W11 and W13 so as to partially overhang the ends of the adjacent can. It will be understood that the plow member engages the side flap W7 at its center and is spaced from the upper and lower ends W11 of the flap. With this arrangement, the cylindric wall of the can functions as a cam for guiding the movement of the plow to effect the in-folding of the side flaps.

Referring now to FIG. 7, tucking fingers generally designated TF are then advanced inwardly at the upper and lower portions of the wrapper so as to engage at the fold lines W11 and force the ends of the side flap W7 and the adjacent portions of W10 snugly into position. Subsequently, the filled package may pass through a compression unit, which is adapted to apply pressure to the side, top and bottom walls, thereby further setting the creases at W9, W11 and W13.

When these operations are properly performed, the cans become securely locked within the wrapper to an extent such that they will not be accidentally dislodged, even though the wrapper is dropped or otherwise subjected to rough treatment. The can-holding action of the corner portions W10, however, depends upon the presence of the tabs W19 and W23, which relieve the corner-retaining parts W10 of the stress of holding all the cans in a row against endwise displacement, and the tabs also tend to prevent an endmost can from rolling endwise and inwardly about the opposite end can. It is important to prevent such rolling movement of one end can with respect to the adjacent end can, because the can might otherwise move clear of the adjacent retaining portions W10.

Figure 10:
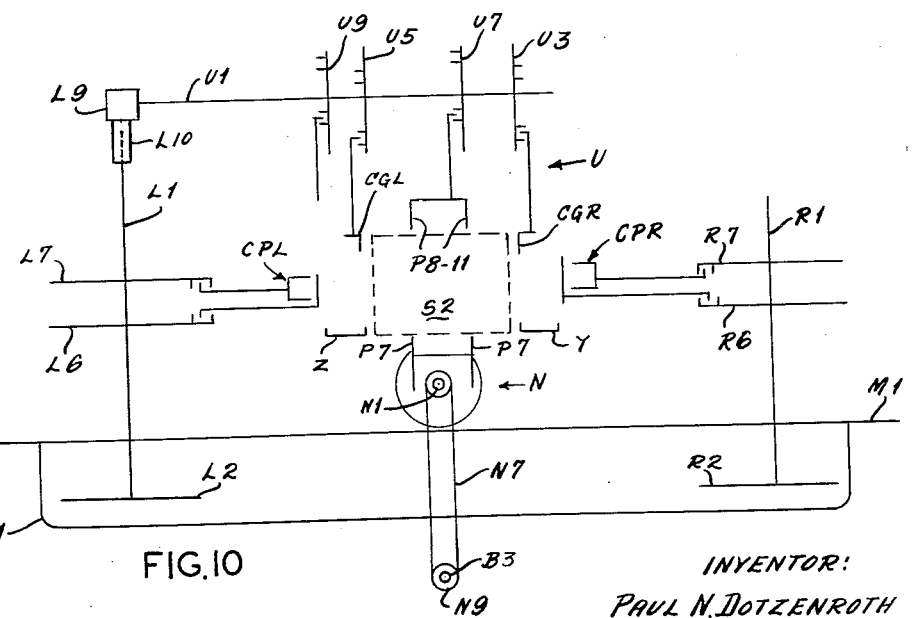
FIG. 10 is a diagrammatic line view similar to FIG. 9 but corresponding in general to a front elevation of the machine and showing certain other power transmitting operating mechanism.

Referring to FIGS. 8–10, the principal components of the machine for performing the above-described sequence of steps include a main base generally designated M, a lower sub-assembly generally designated N, an upper assembly U, a wrapper hopper or magazine generally designated H, and a discharge conveyor generally designated D. The main base has a plate M1 supported, as by legs M2 (FIG. 13), at a convenient working elevation above floor level, and the plate acts as the support for the rest of the machine. The lower sub-assembly N is located generally above the center of the main base and its upper surface defines first and second wrapper stations S1 and S2 to which the wrappers are moved and at which certain folding and can-inserting operations are performed. The lower sub-assembly N also contains the mechanism for actuating (1) the suction cups SC, (2) the lower pokers P1–P7, (3) a wrapper indexing slide having back and front wrapper pushers WPF and WPB, and (4) lower wrapper stops WSL.

The wrapper hopper H is located behind the lower sub-assembly N at an angle so that a wrapper may be pulled from the hopper down onto the rear station S1, the wrapper being opened during this movement. The discharge conveyor D leads from the second or front wrapper station S2 and carries away the filled and closed package. The upper sub-assembly is spaced above the lower sub-assembly and is adapted for vertical adjustment. This upper sub-assembly U contains a retractable member WSQ for squaring a wrapper at the first station S1, mechanism for actuating the upper pokers P8–P11 at the second wrapper station, and retractable can guides CGL and CGR on opposite sides of the two wrapper stations.

As viewed in FIG. 8, the machine has a front, back, right side and left side. The sub-assembly N is shown in FIG. 8 as being in the center of the main base M, and the two wrapper stations are indicated by wrappers at S1 and S2, the first wrapper station being toward the rear of the machine and the second wrapper station being toward the front of the machine. Cans are conveyed to positions at the side of the sub-base or opposite the first and second wrapper stations by means of three can conveyors.

*Can conveyors*

A first can conveyor X extends about a bend from the back of the machine to a position at the right side of the sub-assembly N adjacent the first wrapper station S1. A second can conveyor Y extends about a bend from the front of the machine to a position at the right of the sub-assembly adjacent the second wrapper station S2, and a third can conveyor Z extends about a bend from the front of the machine to the other or left side of the sub-assembly and opposite the second wrapper station S2.

Figure 12:
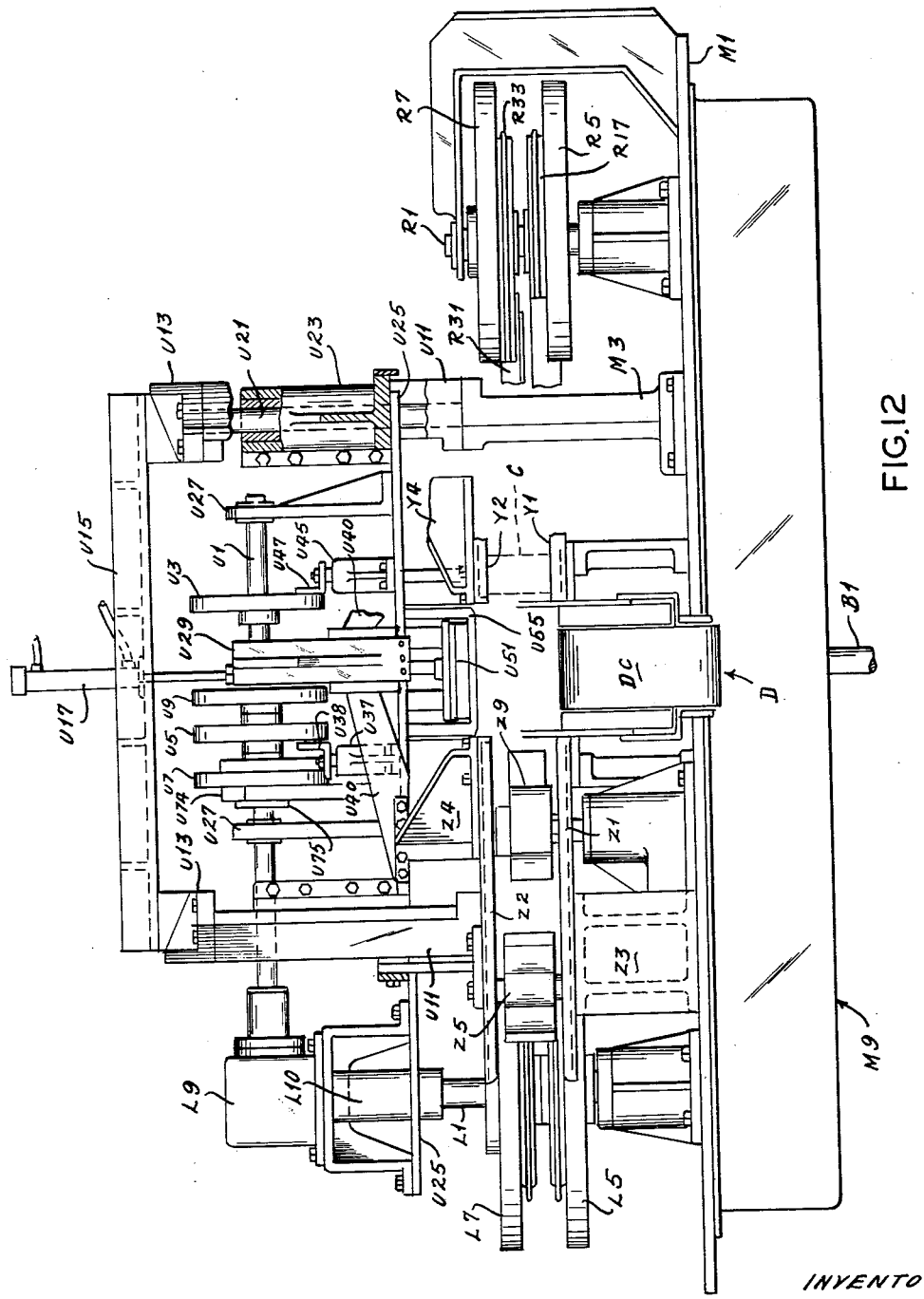
FIG. 12 is a front plan view of the machine, parts being omitted for purposes of clarity.

Each can conveyor has upper and lower trough-like can chutes, such as Y1, Y2, Z1, Z2, the lower can chute being supported by pedestals, such as Y3, from the main base M (FIG. 12). The upper can chute is supported by brackets, such as Y4 and Z4, from the upper assembly U of the machine. As mentioned heretofore, the upper assembly U is vertically adjustable, thereby permitting the machine to be adjusted for cans of varying height, and also simplifying the task of clearing a jam, should such a condition develop.

Operating in association with each can conveyor are certain cam-feeding mechanism including a star retard wheel, such as X5, fixed to a vertical shaft, such as X7. The retard wheel serves to adjust the flow of cans along the conveyor chutes to correspond with the operation of other parts of the machine. It will be understood that cans are delivered to the conveyor can chutes on the machine by conventional can conveyors (dotted lines) at a rate at least equal to the speed of the machine.

The cans move from the retard star wheel X5 to a feed wheel X9 on a shaft X10 located at the bend in the conveyor. The feed wheel X9 has a single feed-lug X11 projecting therefrom, which is adapted to pick up a pair of cans from the retard wheel X5 and sweep them around the bend of the conveyor, where they are then picked up by a reciprocating feed finger X13. The feed finger X13 is pivoted on a bracket X15, which bracket is fastened to a vertical support or pillar M3 secured to the top of the main base. The feed finger X13 is reciprocated by means of a crank arm X17 pivoted to the feed finger and to a feed crank X19, which crank is also secured to the shaft X10 of the feed wheel. The feed finger moves a pair of cans from the feed wheel to a position opposite the proper wrapper station, whereupon the pair of cans are pushed as a unit from the conveyor into an opened wrapper at this station. The second and third can conveyors are of similar construction and operation, but the parts are designated Y or Z.

*Main base and drive system*

The cans are inserted by right and left pushers, which are reciprocated horizontally by means of cams fixed to vertical shafts R1 and L1 on the right and left sides of the machine. As shown in bottom view FIG. 11, the several shafts X7, Y7, Z7, X10, Y10, Z10, R1 and L1 are connected through a gear train to a main vertical drive shaft B1, which is located at the back center of the machine. The main vertical drive shaft B1 is shown more particularly in FIGS. 9 and 13 as being driven, in turn, through a box B2 by a lower horizontal shaft B3, which itself is connected through a coupling B4 and a variable speed reducer B5 to a motor. The variable speed reducer permits the over-all rate of the machine to be adjusted in accordance with the rate of cans delivered to the machine, it being understood that a machine of this type might be operated in connection with a canning line, as at a brewery, and that the speed of the packaging operation should be coordinated with the flow of cans available for packaging.

Figure 13:
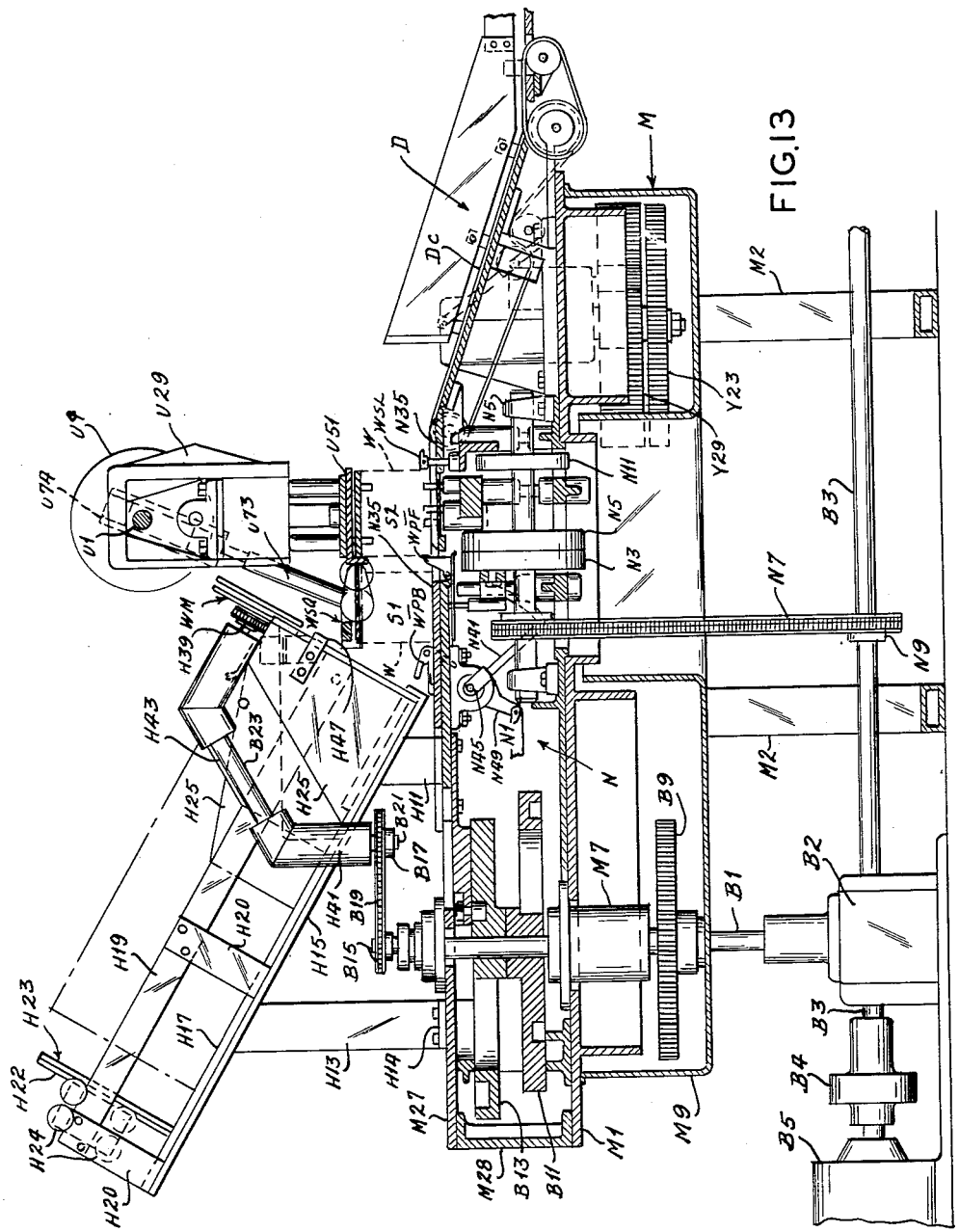
FIG. 13 is a vertical cross-section taken generally on the center line front to back of the machine.

The several vertical drive shafts X7, Y7, Z7, X10, Y10, Z10, R1, L1 and B1 are journalled in separate housings, one of which is shown at M7 in FIG. 13, which housings are fixed in the main base plate M1, and gears are fastened to the vertical shafts beneath the base plate. In addition to the above-mentioned vertical drive shafts, the main base also supports certain vertical idler shafts for interconnecting the several gears beneath the main base. An oil pan M9 is fastened to the bottom of the main base plate M1 so that the gears may turn in an oil bath.

Figure 11:
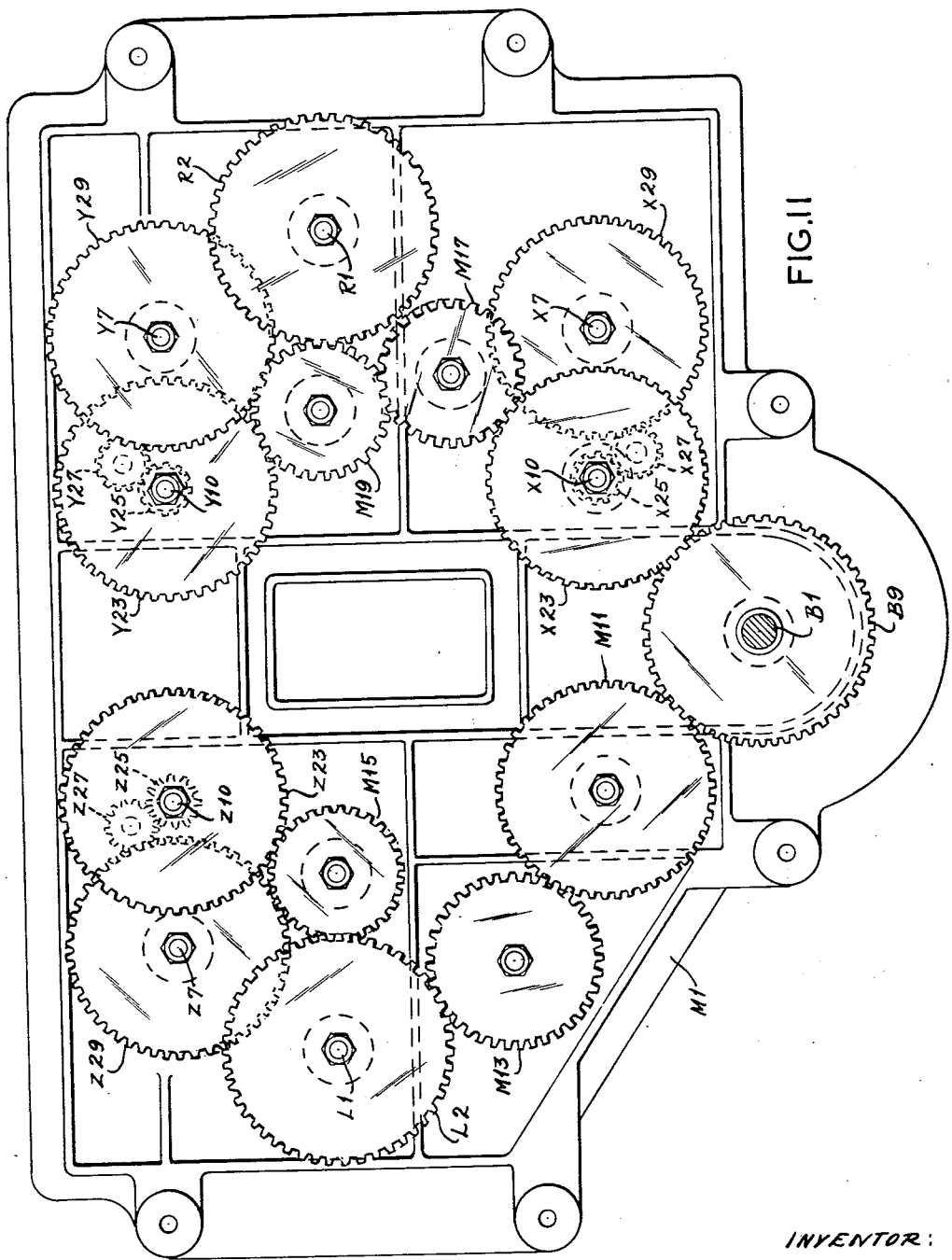
FIG. 11 is a bottom plan view of the main base with the oil pan removed to show the gear train for the main gears which drive certain operating shafts extending through the base.

Referring to FIG. 11, the main drive shaft B1 has a main gear B9, which is in mesh with a gear X23 on the shaft X10 and with an idler gear M11 on the other side of the machine. The gear M11, in turn, meshes with a second idler gear M13, and idler gear M13 is in mesh with a gear L2 fixed to the shaft L1, mentioned above as the cam drive shaft for the can-pusher on the left side of the machine. Gear L2 then meshes with an idler gear M15, and gear M15 is in mesh with a gear Z23 on the shaft Z10 for the front left feed wheel. The gear train continues from a gear Z25 also on shaft Z10 through an idler pinion Z27 to a gear Z29 on the shaft Z7 for the front left can feed wheel.

Looking at the other side of the base, gear X23 is connected to a pinion X25 by the common shaft X10, and pinion X25 connects through an idler pinion X27 to a gear X29 on the shaft X7 for the right back retard wheel. Gear X23 also is connected through idler gears M17 and M19 to a gear R2, which is keyed to the can-pusher cam-drive shaft R1 on the right side of the machine. The idler pinion M19 also meshes with a gear Y23 fixed to the shaft Y10 for the right front can feed wheel, and a pinion Y25, also on shaft Y10, drives an idler pinion Y27, and thereby a gear Y29 on the shaft Y7 for the retard feed wheel at the front right side of the machine.

It will be understood that the gear train is of a character such that the shafts L1, R1 and B1 make one complete revolution during each cycle of the machine, each cycle resulting in the discharge of a completed package. The shafts X10, Y10 and Z10 also make one revolution during each cycle of the machine (thereby to send a pair of cans down each of the three conveyors during each cycle), but the shaft X7, Y7 and Z7 are geared to turn at a slower rate, which is equivalent to one fifth of a revolution during each cycle of the machine so as to pass a pair of cans during each cycle. The star-shaped retard wheels have peripheral indentations for ten cans.

Referring to FIGS. 9 and 10, the machine is diagrammatically shown inside and front elevation with the emphasis on the drive system for certain operating parts. The vertical drive shaft B1 at the back of the machine extends upwardly through and is keyed to a pair of cams B11 and B13. Cam B11 reciprocates a suction-cup slide (to be described), which, in turn, causes the suction cups SC to be manipulated between a retracted position flush with the bottom of wrapper station S1 and an advanced position in engagement with a wrapper in the hopper H. Cam B13 reciprocates an indexing slide and associated wrapper pushers WPF and WPB for advancing a wrapper from the first station S1 to the second station S2 and for moving a wrapper at the second station S2 onto the discharge conveyor DC. The details of this mechanism will be described subsequently.

Shaft B1 also carries a sprocket B15 which drives a sprocket B17 by means of a chain B19. The sprocket B17 is connected through shafts B21 and B23 to a stub shaft B25 at the top left side of the hopper H. The stub shaft B25 is connected through a chain and sprocket drive to a second stub shaft at the top front center part of the hopper, which second stub shaft rotates a wrapper-metering blade WM (to be described) for releasing a single wrapper during each cycle of the machine.

The wrapper indexing and suction-cup mechanism mentioned above form part of the lower sub-assembly N, which also includes a counter shaft N1. The lower pokers P1—7, in part, shown diagrammatically in FIG. 9 are operated by cams N3 and N5 on the counter shaft N1. Shaft N1 extends horizontally, and, in turn, is driven through a chain N7 and sprocket N9 connected with the lower horizontal drive shaft B3. The counter shaft N1 also operates a cam N11 for vertically reciprocating the lower wrapper stop WSL at the front of the second wrapper station.

The lower drive shaft B3 continues forwardly and is connected through a chain and sprocket or other drive B31 to a conveyor belt forming a part of the discharge conveyor, the details of which are not important, hence are not described.

Referring to FIG. 10, the right cam drive shaft R1 extends upwardly through and is keyed to a pair of cans R6 and R7, which reciprocate certain can-pushing and flap-holding devices CPR on the right side of the machine. Similarly, the left cam drive shaft L1 extends through and is keyed to cams L5 and L 7, which reciprocate can-pushing and flap-folding devices CPL on the left side of the machine. The left cam drive shaft L1 continues upwardly to a gear box L9 and is there connected to an upper counter-shaft U1 forming part of the upper sub-assembly U. This upper counter-shaft U1 carries cams U3 and U5 for reciprocating right and left upper can gates CGR and CGL, which guide the cans at the inner ends of the conveyors. A third cam U7 reciprocates the upper tab pokers P8–11 at the second station. An upper wrapper stop member WSU for the second station is associated with the upper pokers, and a fourth cam U9 operates the wrapper-squaring member WSQ over the first wrapper station. The wrapper-squaring member is pivoted for movement between a retracted position clear of a wrapper (as it is drawn from the hopper) and an advanced position down against the top wall of a wrapper at the first station.

The cams above mentioned are designed to operate the associated parts in proper timed relationship. For example, during a first part of the machine cycle, the upper squaring member WSQ at the first wrapper station is retracted by cam U9. The suction cups SC are then manipulated by cam B11 from their retracted to their advanced position and back to their retracted position, thereby to place a wrapper at the first station, and at the same time the wrapper-metering blade WM of the hopper releases a wrapper from the hopper. Also during this first portion of the cycle, the can gates CG would be in their lower advanced positions and cans would then be moved along the respective conveyors to the proper positions opposite the two wrapper stations.

During a next part of the cycle, the cams N3, N5 and U7 for the lower and upper pokers are advanced and the pokers upset the longitudinal and transverse separator tabs. Then, the can gates CG are retracted by cams U3 and U5, and cans are pushed in pairs from their conveyors into opened wrappers at the first and second wrapper stations, the tab pokers being retracted as the cans are moved inwardly. After insertion of the cans at the second station, flap-folding devices are advanced to fold end-retaining flaps on the wrapper inwardly and thereby close the wrapper. The wrapper stops WSL and WSU are retracted, and the wrapper-indexing slide and associated wrapper-pushers WPF and WPB are then advanced by cam B13 to displace the completed wrapper from the second station onto the discharge conveyor and to move the partially filled wrapper at the first station to the second wrapper station. The upper wrapper stop WSU is then lowered by cam U7 (for upper pushers) to hold the wrapper at the second station as the slide and pushers are retracted.

*Lower sub-assembly*

Referring more particularly to FIGS. 14–17, the lower sub-assembly N comprises a lower frame N13, which rests upon and partially fits within an opening N22 in the center of the main base plate M1. The frame N13 supports lower bearing blocks N15, in which the lower counter-shaft N1 is journalled. The shaft N1 extends longitudinally of the machine (from front to back along the center line), and the sprockets N9 are keyed to the shaft adjacent the back end thereof. The cams N3 and N5 for the lower pokers are located forwardly of the sprockets, and the cam N11 for the wrapper-stop members WSL is located at the front end of the counter-shaft.

The lower frame N13 also supports three pairs of vertical guide rods designated N17, N19 and N21 on which shoes N23, N25 and N27 reciprocate, respectively. The shoe N23 carries the back poker P1 and a cam-roller N31, which is engaged within the cam groove of cam N3; the shoe N25 carries front pokers P2–P7 and a cam-roller N33, which is engaged within a cam groove in the cam N5; and the shoe N27 carries the stop members WSL and a cam-roller N34, which is engaged within a cam groove in the cam N11.

Figure 18:
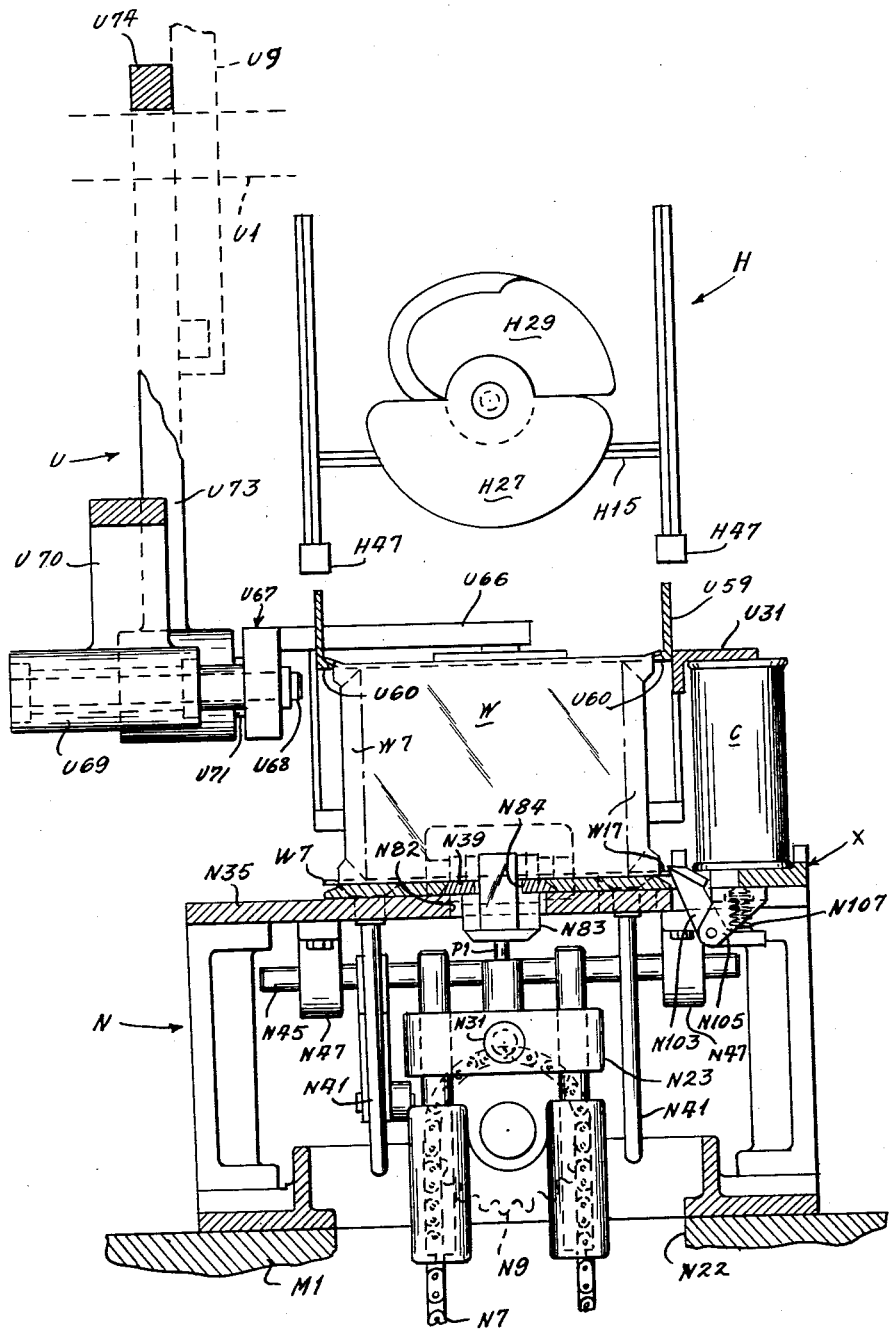
FIG. 18 is a view similar to FIG. 17, but taken generally on the line 18—18 of FIG. 14 to show operative mechanism at the first wrapper station.

The lower sub-assembly N also has an upper mounting plate N35 carried by supports which stand upon the framed N13. A pair of guide strips N37 (FIGS. 16–18) are fastened to the top surface of the mounting plate N35 in spaced relationship to one another on opposite sides of the longitudinal center line, and these guide strips define a dove-tail channel in which a wrapper-indexing center slide N39 reciprocates. The indexing slide, in turn, carries the wrapper pushers WPF and WPB. Also, it will be noted (FIG. 16) that the mounting plate N35, guide strips N37 and slide N39 have suitable openings for accommodating the suction cups SC, lower pokers P1–P7 and lower wrappers stop members WSL.

Figure 14:
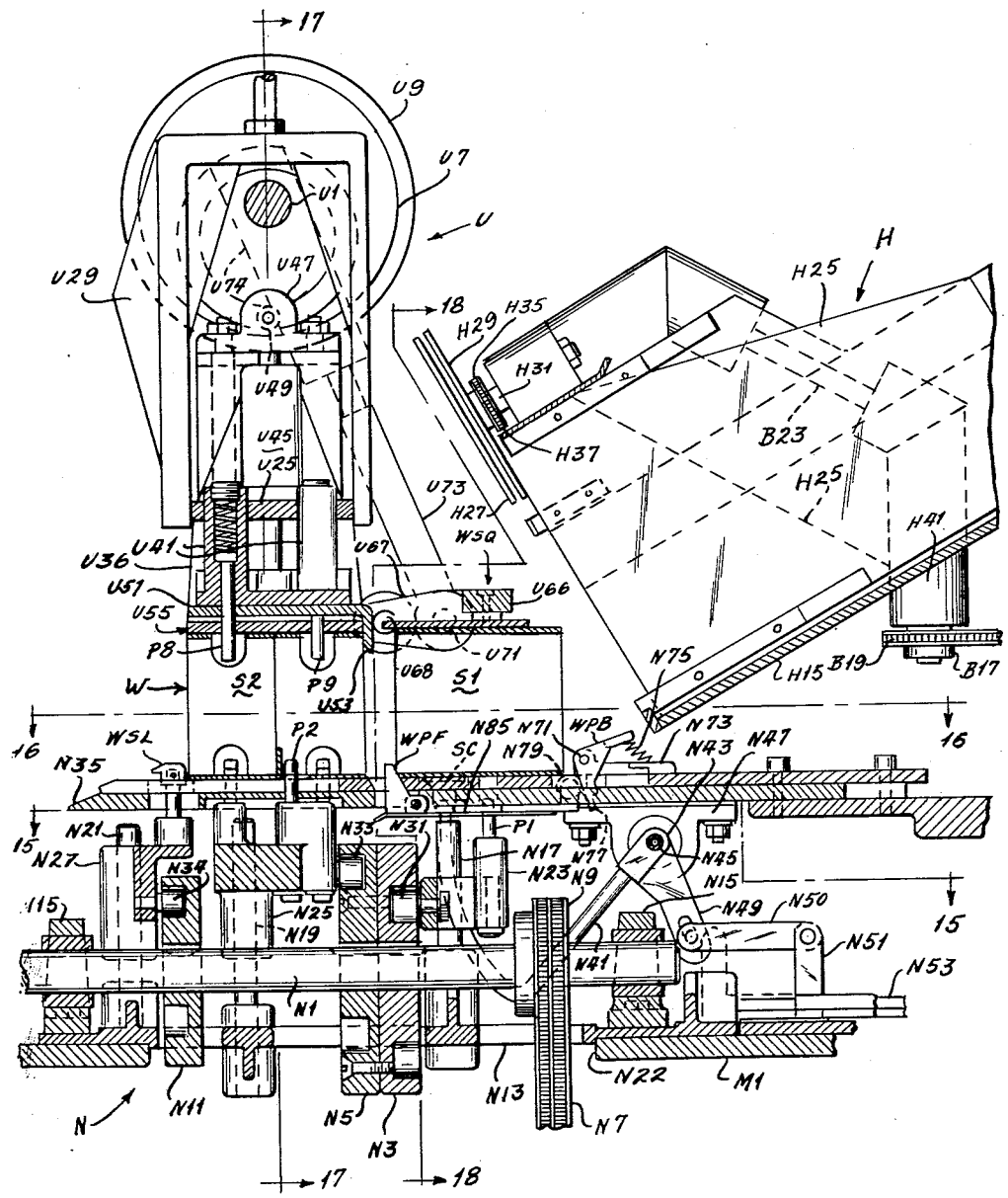
FIG. 14 is a detail vertical section similar to FIG. 13, but from the reversed direction, and showing certain parts of the upper and lower sub-assemblies.
Figure 15:
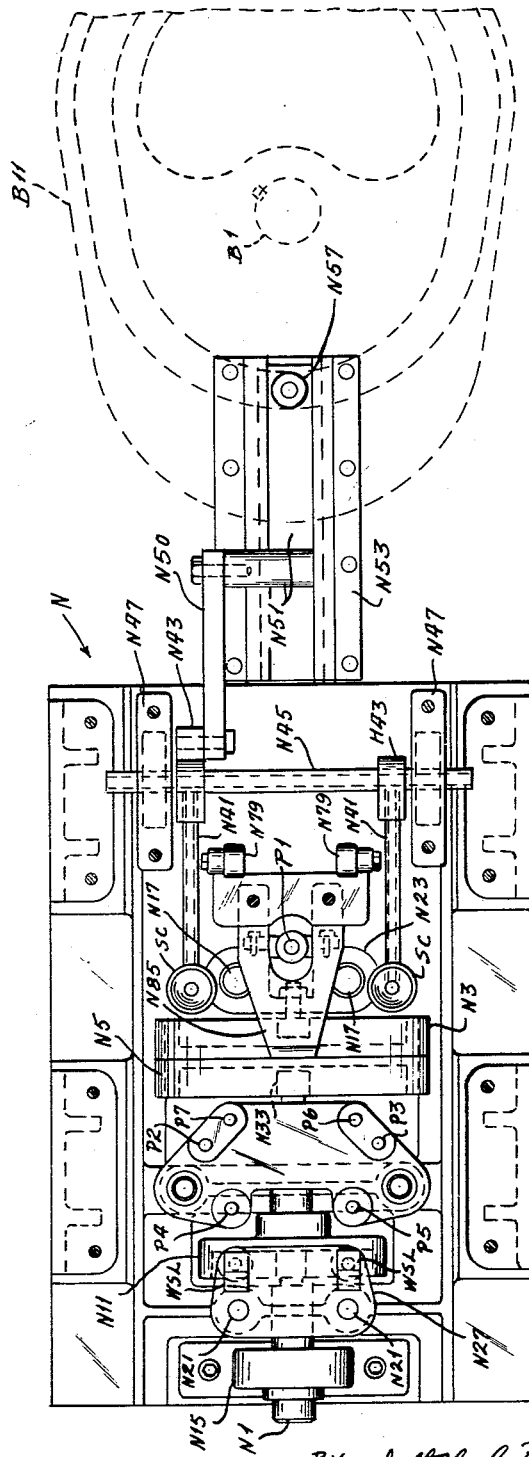
FIG. 15 is a detail horizontal section taken generally on the line 15—15 of FIG. 14, and showing certain operative parts of the lower sub-assembly beneath its top.

The suction cups SC are mounted on tubular arms (FIGS. 14–15) N41, the other ends of which are fastened in hollow pivoted sockets N43, the arms being configurated so that the suction cups may be swung upwardly from a lower position substantially flush with the top of the upper assembly (as defined by the top surfaces of the guide strip N37 and slide N39) to an upper position in engagement with the foremost wrapper in the hopper H. The sockets N43, in turn, ar secured upon a tubular shaft N45, which is journalled in upper bearing blocks N47 fastened to the lower surface of the mounting plate N35 at the back end thereof. A slotted arm N49 depends from one of the brackets N43 for connection through a link N50 with a slide N51, which reciprocates within a guide block N53. The guide block N53 is fastened to the base plate M1 rearwardly of the lower sub-assembly N and is shown in FIGS. 14 and 15. The slide N51 is reciprocated within the guide block N53 by the cam B11, the slide having a back cam-roller N57 engaged within the cam groove of the cam.

It will be understood that the machine includes suitable vacuum means (not shown) connected to the tubular suction cup supporting members, and a valve (not shown) would control the vacuum so as to create a vacuum at the suction cups when they engage a wrapper in the hopper and release the vacuum prior to indexing of the wrapper to the second station. The valves may be of the solenoid type and may be controlled by devices responsive to movement of such parts as the indexing slide and suction-cup slide.

The indexing slide N39 extends rearwardly (FIG. 16) and has a yoke-like extension N61 secured by a spacer block N63 to the bottom thereof. The yoke N61 extends over the top surface of the cam B13 and has an elongate center slot in which the shaft B1 is accommodated for relative sliding movement. Also, a cam roller N65 extends from the yoke line into the cam groove of cam B13.

The back wrapper pusher, generally designated WPB, is mounted on the slide (FIGS. 14 and 16) in a position such as to move a wrapper from the first to the second station. The pusher is pivotally supported at N71 on member N73 and is spring biased at N75 in a clockwise direction (as viewed in FIG. 14) so that the top of the pusher is clear of the path of a wrapper moving from the hopper to the first wrapper station S1 when the slide N39 is in its retracted back position. Upon forward movement of the slide N39, lower feet N77 on the pusher first engage rollers N79 fastened in the mounting plate N35, thereby causing the pusher to rotate in a counterclockwise direction (as viewed in FIG. 14). As the pusher engages the rollers, it assumes an upright position for indexing the wrapper forwardly and is held in the upright position during forward movement by engagement of its feet N77 with the top surfaces of the guide strips N37.

The slide also carries the front wrapper pusher WPF, which is pivotally supported on a member N83 fastened to the bottom on the slide N39 so as to extend through an opening N84 within the slide and a center slot N82 in the mounting plate N35. A leaf spring N85 is also secured to the pivot member N83 so as to project forwardly and engage the bottom of the pusher WPF, thereby tending to hold the pusher in an upright position, but the pusher may rotate in a counterclockwise position against the bias of the leaf spring N85, such being desirable upon rearward movement of the slide so that the pusher may pass beneath a wrapper held at the second station S2 as the indexing slide is retracted. The wrapper is held at the second station by an upper stop to be described, and its forward movement is limited by the lower stop WSL referred to previously, the lower stop being advanced upwardly to stop the wrapper at the second station.

Figure 16:
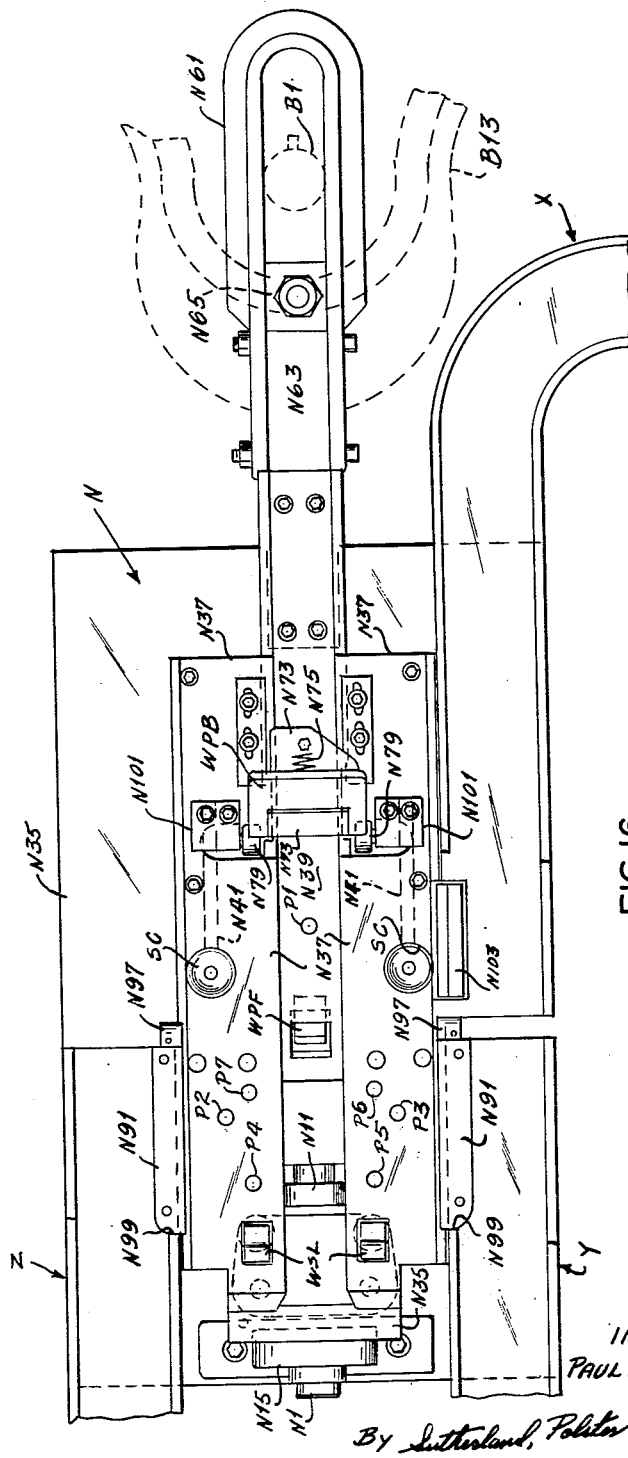
FIG. 16 is a detail horizontal section taken on the line 16—16 of FIG. 14, and showing the top of the lower sub-assembly.
Figure 17:
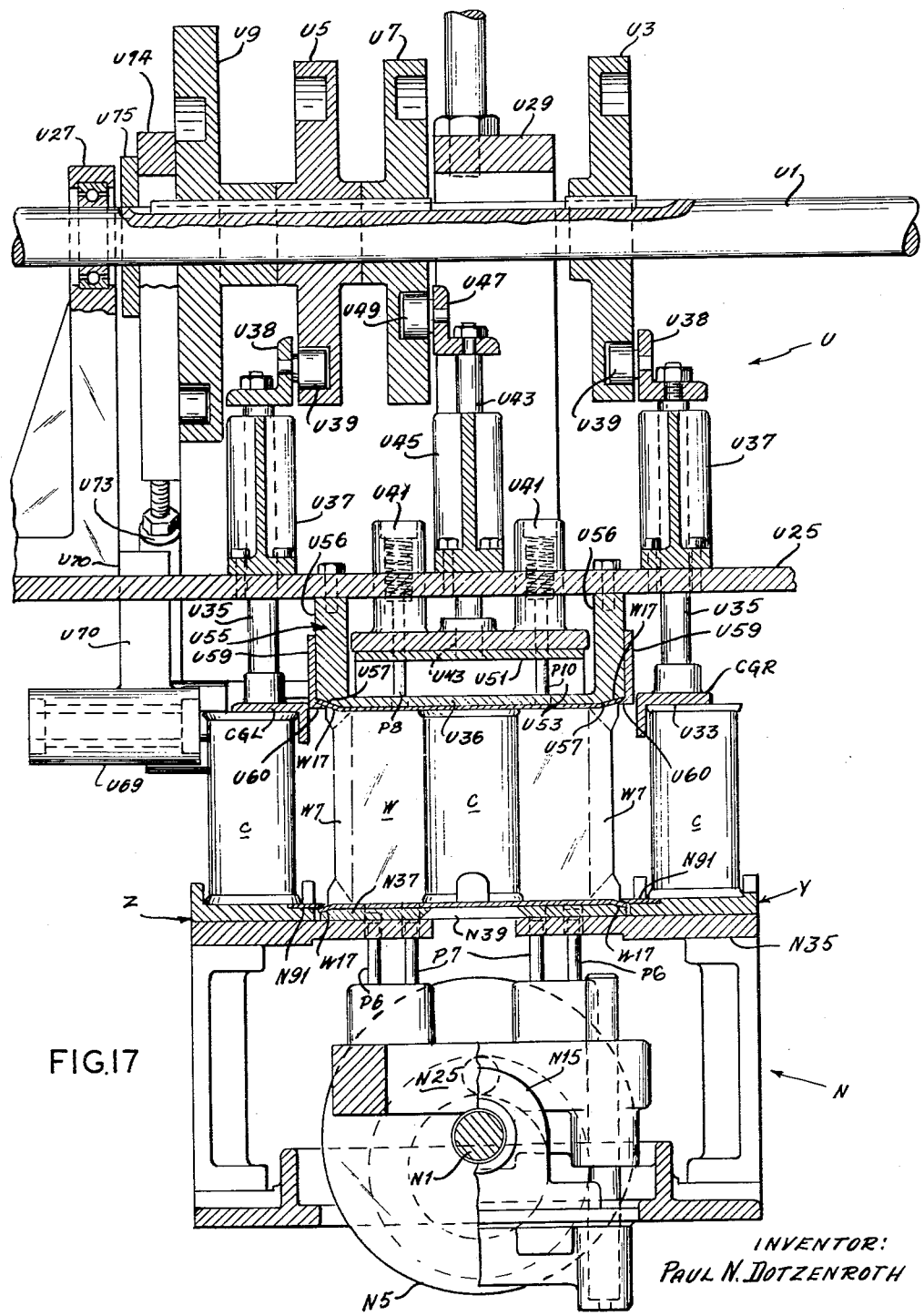
FIG. 17 is a detail vertical cross section taken generally on the line 17—17 of FIG. 14, and showing certain portions of the upper sub-assembly and a partially filled wrapper at the second station.

The lower can chutes X1, Y1 and Z1 rest upon the upper surface of the mounting plate N35 outwardly of the guide strips N37 (FIG. 16). The two front can chutes Y1 and Z1 are recessed along their inner margins adjacent the guide strips N37 to accommodate wrapper hold-down plates N91 (FIGS. 16 and 17), which project inwardly from the respective can chutes. The outer margins of the guide strips N37 are beveled at N93 and with the members N91, define slots for accommodating the outer projecting margins W17 on the bottom wall of the wrapper. In moving a wrapper from the first station to the second station, the outer end margins of its bottom wall are guided beneath the hold-down members N91 by tapered spring clips N97 which project rearwardly from the front lower can chutes at the space between the first and second wrapper stations. Although the lower can chutes have can-guiding flanges at the side margins which extend throughout most of their length, the margins are cut away at N99 on the inner side adjacent the guide strips so as to permit the cans to be pushed from the conveyors into a wrapper, and the flanges are in part cut away on the outer margin to clear a path for the can pushers CPL and CPR (to be described). As the cans are pushed from the lower chutes Y2 and Z2, the hold-down members N91 guide the cans over the bottom edges W17 of a wrapper at the second wrapper station.

The back lower can chute X1 terminates on the right side of the first wrapper station S1. Box aligning members N101 are secured to the guide strips N37 at the back of the first wrapper station S1, thereby to center a wrapper placed thereon by the suction cups. The cans are then guided over the lower bottom edge of the wrapper at the first station S1 from the can chute X1 by means of a pivoted spring biased hold-down member N103 on a support N105 (FIGS. 16 and 18), which is fitted within an opening in the lower can chute X1 and right side of the mounting plate N35. This hold-down member N103 is normally biased by spring N107 upwardly and outwardly to a position clear of the wrapper station S1, and is moved downwardly into engagement with the margin W17 of the bottom wall as the cans are moved from the can chute into the wrapper. The end margins of the top wall are similarly held clear of the cans, as will be described in detail in connection with the upper sub-assembly U.

*Upper sub-assembly*

The upper sub-assembly comprises four pillars U11 (FIG. 12) which are supported upon the four pillars M3 (FIG. 8) of the main base. The pillars U11 are connected at their top ends by side braces U13 (FIG. 12), which, in turn, support a cross brace U15. A hydraulic lifting unit U17 is mounted on the center of the cross brace and is connected to a vertically-adjustable part of the upper sub-assembly. The vertical supporting members U13 also carry vertical guide rods U21 on which guide members U23 reciprocate. A guide member U23 is located on each side of the machine to slide on the two guide rods U21 supported on that side of the machine. A narrow elongate plate U25 is fastened to the bottom surfaces of the two guide members so as to extend transversely of the machine. The left end portion of plate U25 projects beyond and is apertured to receive the left cam shaft L1 and support the journal box L9. A splined sleeve or other telescoping connection L10 connects the shaft L1 with the journal box L9, so as to permit vertical movement of the box and supporting member U25 relative to the shaft L1.

The upper counter-shaft U1 extends from the journal box L9 and is supported in bearing supports U27, which stand upon the plate U25. A stirrup-like member U29 straddles the front and back edges of the supporting plate U25 generally in the center thereof and is secured thereto to project upwardly. The stirrup member U29 is then connected to the hydraulic lift unit U17 so as to permit vertical adjustment of the supporting member U25 and the parts carried thereby, including the guide members U23, which slide on the guide rods U21. A manual lifting pump may be connected to the hydraulic lift U17 and there may be suitable locking means (not shown) for securing the upper assembly in proper position.

As indicated previously, the upper counter-shaft U1 has cams U3, U5, U7 and U9 keyed thereto. The cams U3 and U5 operate the upper right and left can guide members CGR and CGL, respectively. The right can guide CGR is an angle-like section extending along the inner margins of the two conveyors X and Y on the right side of the machine. The upper can chutes X2 and Y2 terminate short of one another so as to leave a space therebetween in which the can guide CGR is accommodated. A depending flange U31 of the can guide has the function of guiding the cans along the inner side of the machine, this being desirable because the inner retaining flanges are cut away on the bottom can chutes X1 and Y1 to permit the cans to be pushed therefrom into wrappers. On the other hand, the gate must, at the proper time, be elevated clear of the cans in order to permit the can pushers to move the cans from their conveyors. The can guide CGL on the left side of the machine is disposed at the inner end of can conveyor Z, whose upper can chute Z2 terminates short of the lower chute Z1 in order to accommodate the guide CGL.

The can guides are mounted upon rods U35 which are slidably contained in housings U37, the housings being secured to the supporting plate U25. There are two rods U35 for each can guide, which are connected at their lower ends to the respective can guides and at the upper ends to a member U38 having a cam roller U39, which is engaged within a cam groove in the associated cam U3 or U5.

The three upper can chutes X2, Y2 and Z2 are carried on supporting members Y4, Z4 and U40, which are fastened to the transverse plate U25 and stirrup U29. Consequently, the upper can chutes are adjusted vertically with the other parts, thereby to permit the machine to be readily adjusted to handle cans of varying height and to facilitate access to the interior, in the event of a jam.

The upper pokers P8–P11 are spring mounted in an upper poker housing U41, which housing is supported upon a pair of reciprocating rods U43. The rods U43 are slidably supported in a Thompson housing U45, which is bolted to the plate U25, and the rods are connected at their upper ends to a cam-roller member U47. A cam-roller U49 is then engaged within the cam groove in the cam U7, so that the poker housing is moved vertically between a depressed and retracted position. The upper wrapper stop WSU is a flanged plate U51 secured to the lower surface of the poker housing U41, the plate having back depending flange U53, the purpose of which is to hold a partially filled wrapper in the second wrapper station when the wrapper-indexing slide is retracted. It will be understood that the supporting plate U25 has suitable openings for accommodating the upper projecting portions of the poker housing and the rods U43. Also, the wrapper-retaining plate U51 has a pair of openings for accommodating the two back upper pokers P10 and P11.

The poker housing and retaining plate reciprocate within a space defined below the supporting plate U25 by a U-shaped member U55, which has a set of four openings in its bottom wall U36 for accommodating the four upper pokers. The bottom wall U36 of member U55 is spaced immediately above the second wrapper station, and the sides U56 of the member are being bolted to the lower surface of the supporting plate.

The bottom wall U36 is beveled along its margins U57, and plates U59 are secured to the sides U56 of the fixed channel member, which plates U59 have in-turned lips U60 spaced slightly below the beveled surface U57, thereby to define slots for receiving the top end margins W17 of the wrapper W. Accordingly, the end margins of the top wall are held upwardly to facilitate insertion of the cans at the second wrapper station S2. The plates U59 also project rearwardly along opposite sides of the first wrapper station S1 (FIG. 18), where the lips U60 help to open the wrapper and hold it open during insertion of the first two cans and thereafter guide the upper end margins of the wrapper during movement to the second wrapper station.

As explained in connection with FIG. 1, the wrapper is pulled from the hopper by the suction cups, and is simultaneously opened, the initial opening of the wrapper occurring as the top wall thereof engages carton-breaking members (to be described) on opposite sides the hopper. The wrappers are, course, shipped in a collapsed condition such that the top wall overlaps one of the side walls while the bottom wall overlaps the other side wall, the edges W17 of the top wall projecting behind the edges U15 of the side walls. Collapsed wrappers are placed in the hopper with the bottom wall facing forwardly at the lower part of the hopper and with the top wall facing rearwardly in the upper part of the hopper. Accordingly, as the wrapper is withdrawn from the hopper, opening members at the sides thereof engage the edges of the top wall without contacting the edges of the overlapping side wall, and as the bottom wall is pulled downwardly by the suction cups, the top wall is restrained, with the result that the wrapper is automatically broken open. When the wrapper is then brought down into the first station, the end margins of the top wall engage the lips U60 of the rearwardly projecting plates U59, which function as retaining rails extending below the top wall at the end margins thereof at both wrapper stations.

When in the first wrapper station, the wrapper is further adjusted to proper shape by the upper squaring device WSQ (FIGS. 14 and 18), which has a plate mounted upon an arm U66 of a pivoted bracket U67. This bracket is pivoted at U68 in a journal bracket U69, which has supporting parts U70 extending rearwardly and downwardly from the top of the supporting plate U25. The bracket U67 is mounted on the left side of the machine, as viewed from the front, and has a stud U71 projecting sidewise therefrom rearwardly of the pivot U68. A crank arm U73 is connected to the stud, and a yoke U74 extends upwardly from the crank arm U73 to the upper counter-shaft U1. The yoke is maintained against the cam U7 by a collar U75 and has a cam-roller U76 engaged within the cam groove of the cam U9. The yoke depends at a slight angle in the rearward direction and the motion is such that the box squaring plate is swung upwardly to a retracted position and then downwardly to a horizontal position over the first wrapper station. The squaring plate is swung upwardly in order to clear a path for a wrapper drawn from the hopper, whereupon the squaring plate engages the top wall of the wrapper and holds the top wall on the retaining lips U60 of retaining members U59 at the first wrapper station.

Can pushers and flap folders

Referring now to FIGS. 8 and 19-22, can-pushing and flap-folding mechanism, generally designated CPL and CPR, are mounted on the left and right sides of the machine, and are driven, respectively, by the vertical drive shafts R1 and L1. The two mechanisms are identical except that one is a reverse of the other, hence the description of the right mechanism also applies to the left mechanism. The lower vertical pillars M3 on the right side of the machine support a pair of opposed brackets R11 in which horiztonal rods R15 slide (FIG. 21). The rods R13 are secured to opposite sides of a carriage R15 so that the carriage may reciprocate toward and away from the center of the machine. A yoke R17 is fastened to the outer end of the carriage to extend about the shaft R1 above the lower cam R5, and a cam-roller R19 projects downwardly from the yoke into the upwardly opened cam groove of cam R5.

An arm R21 is fastened to the back inner part of the carriage R15 to extend rearwardly, inwardly and upwardly therefrom, and a back can pusher R23 is adjustably fastened to the end of this arm opposite the first wrapper station. The back pusher R23 is adapted to move a pair of cans from the back can conveyor X into the center of the wrapper. While there is no similar can conveyor at the back left side of the machine, a similar left back can pusher would be provided to reciprocate inwardly and help center the cans which are moved by the right back pusher R23.

A front can pusher R25 is provided opposite the second wrapper station, and this pusher is mounted upon upper and lower guide rods R27 and R28 which slide within a bearing housing R29 formed on the inner front part of the carriage opposite the second wrapper station. The upper guide rod R27 projects outwardly through the bearing housing R29 above the carriage, and its outer end carries a cam-roller block R31 having a roller R32 engaged within the downwardly opened cam groove of the upper cam R7. A yoke R33 is also fastened to the cam-roller block R31 and extends about the shaft R1. Collars R36 are attached to the shaft R1 to hold the two yokes R17 and R33 against their respective cams R5 and R7.

The arrangement of the cam grooves of the respective cams is that the front can pusher R25 (slidably mounted on the carriage R15) is advanced prior to advance of the back hand pusher R23 fixed on the carriage. This is so because the carriage R15 also carries certain flap folding devices for closing the end of the wrapper at the second wrapper station after insertion of the cans therein.

It will be noted that the front can pusher R25 is of a width greater than the width of the wrapper and has angled surfaces R37 adapted to engage the end edges W15 of the side walls (or of side end flaps W7), thereby bending the flaps W7 inwardly a slight amount. The edges W15 are then engaged by plows R39 having end notches R41. There are two plows R39 pivoted on vertical shafts R43 at opposite sides of the inner bearing housing R29. The plows are biased by leaf springs at R45 so that the notched ends R41 are moved inwardly a predetermined distance determined by a stop member R47 on the inner end of the carriage, and the plows are disposed to engage flaps W7 intermediate top and bottom walls of the wrapper. Tucking fingers R49 are pivotally mounted on shafts R43 above and below the notched plows R39, and these tucking fingers have angled ends R50 (as viewed in side elevation) (FIG. 20) for engagement with the in-folded corner-retaining sections W10 of the wrapper adjacent the top and bottom walls.

The initial positions (FIG. 8) of each plow R39 is such that when the carriage is advanced, the notched ends R41 of the plows first engage the cylindric sides of the can C at points inwardly of the partially bent flaps W7. The ends R41 of the plows are then cammed or guided outwardly by the cylindric walls of the cans into engagement with the end edges W15 of the wrapper, whereupn the edges W15 are then caught in the notches R41. As the carriage continues its inward advance, the plows are cammed apart by engagement with the cylindric cans, the plows then bend the flaps W7 back into the wrapper, where they are retained between the side walls W3 and the cans C. As the side end flaps W7 are folded back, the corner sections W10 of the wrapper are doubled back, and the angled ends R50 of top and bottom tucking fingers then engage the doubled sections W10 to push them back and complete the shaping of the end closure of the wrapper.

Hopper

Referring to FIG. 13, the hopper sits upon a plate M27 generally above the back vertical drive shaft B1. The plate M27 is carried by supports M28, which stand upon the back curved portion of the main base plate B1, the plate M27 and supported M28 thereby also functioning as an enclosure for the cams B11 and B13.

The hopper has front supporting feet H11 secured by brackets to the plate M27, and back supporting feet H13 are bolted at their lower ends by a cross plate H14, which is fastened to plate M27. The front and back supporting feet H11 and H13 are formed with angled upper ends, which are secured to the lower surface of a hopper bottom plate H15, so that the hopper extends in forwardly converging relationship with respect to the supporting plate M27. The supporting plate M27, in turn, is generally coplanar with the upper mounting plate N35 of the lower sub-assembly N.

The wrappers are supported as a stack within the hopper on thin narrow slide strips H17 secured to the top surface of the hopper bottom plate H15. The sides of the hopper are defined by elongate side guide rails H19 carried by brackets H20 at the back and center of the bottom plate and by front side members H25. The side rails H19 also function as guides for a carton holddown assembly, generally designated H23. The holddown assembly has rollers H24 cooperable with the side rails H19, and the rollers support a platen H22, which is adapted to engage the back-end of the stack of wrappers, thereby gravity biasing the wrappers forwardly within the hopper. The hold-down assembly may be pulled back manually to a retracted position, wherein it is held by engagement of the rollers within indentations in the side rails, this being desirable when the wrappers are added to the stack within the hopper.

Referring to the front-end of the hopper, a wrappermetering assembly generally designated WM is secured to the top front portion of the hopper on a top plate H25 bridging the front side plates H25.

The hopper metering or separating assembly WM has a front semi-circular blade H27 (FIG. 18) and a back semi-circular blade H29, which are angularly displaced relative to one another at an agle of about 180°. The back blade H29 functions as a slicer for separating a foremost wrapper from the stack thereof and holds the remainder of the stack from forward movement. While the back blade is holding the remainder of the stack, the front blade H27 is in the upper segment of its revolution and releases the foremost wrapper so that it can be pulled from the hopper by the suction cups. Necessarily, the advance of the suction cups is synchronized with rotation of the metering blades. After the foremost wrapper is withdrawn from the hopper, the front blade H27 moves through the lower segment of its revolution to hold the stack, and the back blade H29 then moves through the upper segment and permits the stack to move forwardly against the front blade, preparatory to slicing a second wrapper from the supply.

The metering blades are secured to a stub shaft H31, which is journalled in a bearing housing (FIG. 14). A sprocket fastened to this stub shaft is then driven by a chain H37, which extends to a sprocket H39 at the left side of the hopper (as viewed from the front of the machine) (FIGS. 9 and 13). This sprocket H39 is driven by shafts B21 and B23 through universals, the shafts being driven by the chain and sprocket drive B15, B17 and B19 from the back vertical drive shaft B1. The universal shafts B21 and B23 are supported in bearing housings H41 on a plate H43 at the left front side of the hopper.

Finally, it will be noted that carton-opening members H47 are secured to the front sides of the hopper to project forwardly therefrom. The carton-opening members extend forwardly and have ends turned inwardly to engage the ends of the top wall of the wrapper, as it is withdrawn from the hopper, thereby initially breaking the wrapper to an open condition.

Operation

In starting the machine, a pair of cans are fed down the back conveyor X to the first wrapper station S1, but cans are not fed to the first wrapper station during the first cycle of the machine. Initially, the upper wrappersquaring device WSQ is in its retracted position clear of the hopper; the wrapper-indexing slide and wrapper pushers WPF and WPB are in their retracted positions; the can-pushers and flap-folding devices CPL and CPR are retracted; and the lower pokers P1–P7 are retracted. The upper pokers P8–P11 and associated upper wrapper stop RSU are advanced, although there is no wrapper at either station, and the upper can gates CGL and CGR are lowered.

The suction cups SC are then elevated into engagement with the foremost wrapper in the hopper H and a vacuum is established therein to grip the wrapper at its bottom wall W5. At the same time, the wrapper-metering device WM rotates to a position wherein the front blade is in the upper portion of its revolution, so as to release the front wrapper, while the back blade has rotated to its lower position for holding the remaining wrappers within the hopper and separating the first wrapper from the remaining wrappers. The suction cups are then drawn downwardly by cam B11, and as the bottom wall of the wrapper is pulled from the wrapper, the wrapper breaking members H47 at the sides of the hopper engage the top wall W1 of the wrapper at its end margins, thereby initially breaking the wrapper to a partially open condition.

As the bottom wall of the wrapper is pulled down onto the upper surface of the indexing slide N39 and associated guide strips N37 at the first work station, the end margins W17 of the top wall are brought down against the retaining lips U60 of the retaining plates U59 forming part of the upper assembly. The upper squaring device WSQ follows the top wall of the wrapper down and holds it against the retaining lips U60, thereby squaring the wrapper at the first station.

Next, the cam N3 advances the lower poker P1 at the first wrapper station to upset the center longitudinal separator tab in the bottom wall of the wrapper. Meanwhile, a pair of cans have been delivered down the lower can chute X1 to a position opposite the right side of the first wrapper station, the cans having been metered by the retard wheel and advanced by the feed wheel and feed fingers to this position. The cans having arrived at positions opposite the first station, the adjacent can gate CGR is lifted by cam U3, whereupon the can-pusher carriages R15 and L15 are advanced by cams R5 and L5. The back pusher R23 on carriage R15 moves the cans from the conveyor X into the center of the wrapper, and as the cans move into the wrapper, the lower poker P1 is retracted. At the same time, the back can-pusher L23 on the left side of the machine is also advanced to help center the cans within the wrapper. Also, the lower hold-down member N103 at the first wrapper station is depressed by the cans so that its lip comes down over the lower end margin of the wrapper and guides the cans from the conveyor into the wrapper. The upper end margin of the wrapper, necessarily, is held by the lip U60 of the upper right retaining member U59, so that the cans will not catch at this point.

The back can-pushers are then withdrawn from the wrapper, and (after release of the vacuum in the suction cups) the wrapper-indexing slide is advanced by cam B13, thereby causing the back wrapper pusher WPB to be erected and moved forwardly so as to move the partially-filled wrapper from the first to the second station, the lower wrapper stop WSL at the front of the first station having been advanced so as to limit the forward movement of the wrapper. During forward movement of the wrapper, its top end margins ride along retaining lips U60 into the space therefore beneath the beveled margins of member U55, and the lower margins are guided by clips N97 beneath the beveled margins of hold-down members N91.

Before the indexing slide is retracted, the upper poker assembly is advanced or depressed by cam U7, thereby causing the upper wrapper stop WSU to be brought down to overhang the back of the wrapper at the first station, whereupon the indexing slide is retracted. During retraction, the front wrapper pusher WPF is cammed downwardly against the bias of its spring N85 by engagement with the bottom wall of the partially-filled wrapper in the first station. When the upper poker assembly is depressed, the four pokers, P8–P11 thereof, cause the upper transverse separator tabs to be deflected down on opposite sides of the two center cans within the wrapper.

Meanwhile, a pair of cans are delivered down each of the front conveyors Y and Z to positions alongside the second wrapper station, the can gates CGL and CGR being first lowered by cams U3 and U5 to can guiding positions. At the same time, two more cans are delivered down the back conveyor X to a position opposite the right side of the first wrapper station. After the indexing slide has been retracted, a second wrapper is withdrawn by the suction cups to the first wrapper station S1, and as explained heretofore, the cycle is repeated with respect to the first wrapper station.

As this cycle is repeated, however, the lower pokers P2–P7 at the second wrapper station are advanced by cam N5 so as to upset the remaining longitudinal and transverse separator tabs in the bottom wall of the wrapper. With the cans delivered to the wrapper station, the can gates CGL and CGR are again lifted, whereupon the front can-pushers R25 and L25 are advanced by the cams R7 and L7 to move the cans from conveyors Y and Z into the wrapper at the second station. As the cans move inwardly, the lower pokers P2–P7 and upper pokers P8–P11 are withdrawn, and as the upper pokers are withdrawn, the upper wrapper stop WSU is also retracted. At about the same time, the lower wrapper stop WLS is retracted, thereby preparing for the next wrapper indexing step.

As the front can pushers have moved the cans into position within the wrapper at the second station, they engage the side edges W15 of the wrapper to bend them inwardly, as explained heretofore. The two carriages R15 and L15 follow behind the advance of the front can pushers, and as the carriages advance, the back pushers R23 and L23 insert a pair of cans at the first station. Also, the plows, such as R39, at the second station engage the cylindric sides of the cans inwardly of the bent side flaps W7 of the wrapper. As the carriage continues its inward movement, the cans cam the plows outwardly (relative to the wrapper) so as to catch the flaps W7 within the notches R41 of the plows. The continuing advance of the plows (and carriage) causes the plows to be cammed further outwardly by the cylindric walls of the cans, thereby to carry the side flaps W7 of the wrapper back into the wrapper, where they are held by the cans. During the in-folding of the side-wall flaps W7, the associated corner sections W10 are in part double-folded, and the tucking fingers (R49) follow the plows inwardly to push the double-folded sections W10 back within the wrapper, thereby causing other portions of the corner sections W10 to be displaced into overhanging relationship with the top and bottom ends of the outer cans.

The can-pushing and flap-folding devices are then retracted and the wrapper-indexing slide is advanced, whereupon the front wrapper pusher WPF moves the front completed wrapper from the station S2 onto the discharge conveyor D, and the back pusher WPB moves the partially filled wrapper at the first station to the second station.

Thereafter, it repeats its cycle, each cycle including the steps of (1) placing and partially filling a wrapper at the first wrapper station, (2) filling and closing a wrapper at the second station, (3) moving the closed wrapper from the second station to the discharge conveyor, and (4) moving the partially filled wrapper from the first station to the second station. The cam-control of the overall operation permits the machine to be operated at a high speed and also permits the overall speed to be adjusted as desired. Moreover, the adjustability of the upper assembly permits the machine to be adjusted for use with cans and wrappers of varying height, within reasonable limits.

Although one embodiment has been disclosed in detail, it is to be understood that the invention and its various aspects are not limited to this one embodiment, but the drawings and description should be taken as being merely illustrative of the features of structure, function and mode of operation disclosed herein. For example, a somewhat simpler machine might be utilized for packaging a row of three cans within a narrow wrapper, or the six-can machine could be readily modified to handle a three-can wrapper. Also, various features of this machine would be useful in packaging articles within wrappers having other types of end closures, or conversely, the flap-holding features of the invention might be utilized with other types of wrapper delivery and can inserting mechanism.

Having thus described the invention, what is claimed and desired to be secured by Letters Patent is:

1. In packaging apparatus of the character disclosed, the improvement that comprises a table upon which a sleeve-like wrapper is placed, means for delivering a wrapper to a position upon said table, an article-conveying chute extending adjacent said table for delivering an article to be packaged to a position opposite an open end of a wrapper placed upon said table, means for moving articles along said chute, an article pusher mounted adjacent said chute and movable from a position clear of said chute to a position wherein an article is pressed within a wrapper upon said table, and a wrapper-folding member mounted on said article pusher and movable in timed relationship therewith to fold an end portion of said wrapper into article-retaining position while the article is pressed within the wrapper.

2. Apparatus as set forth in claim 1, wherein the article is of generally cylindric shape, and wherein said wrapper-folding member is adapted to move into engagement with the cylindric side of said article and be guided thereby.

3. Apparatus as set forth in claim 2, wherein said article pusher is adapted to bend said end portion of the wrapper inwardly against the cylindric side of the article after insertion of the article, said wrapper-folding member being movable against said article in delayed relationship with respect to the movement of the article pusher, so as to be guided by cylindric side of the article against said inwardly bent end portion of the wrapper.

4. In packaging apparatus of the character disclosed for inserting articles within sleeve-like wrappers; the improvement that comprises a platform upon which a sleeve-like wrapper is placed, a hopper containing a supply of collapsed wrappers mounted generally above said platform, the collapsed sleeve-like wrappers being positioned in the hopper with a bottom wall facing outwardly in the lower part of the hopper, a top wall facing inwardly in the upper part of the hopper and with side walls interconnecting the top and bottom walls, and the top wall of the wrapper having relatively rigid end portions projecting beyond the end portions of the overlying side wall; a suction cup mounted for movement from a position adjacent the platform to a position in engagement with the bottom wall of a wrapper in said hopper, thereby to withdraw a wrapper from the hopper and position it upon the platform; and wrapper opening guide means disposed in the path of the wrapper movement for engaging said end projections of said top wall when the bottom wall is pulled down by the suction cup upon the platform, thereby to open the wrapper to a generally rectangular shape.

5. Apparatus as set forth in claim 4, further including means for moving the opened wrapper generally horizontally from a first position to a second position, said wrapper opening means extending parallel to said direction of wrapper movement in position for cooperation with the top wall end projections, whereby said wrapper is maintained in its opened condition by said guide means during movement from said first to said second position.

6. Apparatus as set forth in claim 5, wherein said bottom wall of the wrapper also has relatively rigid endwise projections, and bottom wall retaining means mounted adjacent said platform at said second position in position for cooperation with the bottom wall end projections, thereby to hold the bottom wall against said platform as said wrapper is moved from said first to said second position.

7. In packaging apparatus of the character disclosed, comprising a platform onto which wrappers are delivered; means for delivering a wrapper to said platform, inserting articles within the wrapper and closing the ends of the wrapper; and an upper operating assembly adapted to engage the upper part of a wrapper on said platform, said upper operating assembly being adjustable toward and away from said platform, means for delivering articles to the platform comprising upper and lower conveyor chutes, said upper conveyor chutes being carried with said upper operating assembly so as to be adjustable vertically with said upper operating assembly, thereby to permit adjustment of the apparatus to articles of varying height and to facilitate clearing of a jam within the packaging apparatus.

8. In packaging appartus for inserting a cylindric article within and closing the end of a sleeve-like wrapper having a foldable end wall portion which folds back into retained engagement with the cylindric wall of the article; the improvement that comprises a first member for folding said foldable end portion of the wrapper wall inwardly into position wherein the edge thereof is in engagement with a cylindric surface conforming to that of the article, and a second wrapper-folding member mounted for subsequent movement into engagement with said cylindric surface, said second member being movable laterally so as to be cammed by said cylindric surface into engagement with the edge of said folded wrapper portion, said second member thereafter carrying said foldable end portion of the wrapper inwardly to retained position in engagement with the cylindric wall of the article.

References Cited in the file of this patent

UNITED STATES PATENTS

| | | |
|---|---|---|
| 2,351,596 | Brogden | June 20, 1944 |
| 2,662,356 | Swafford | Dec. 15, 1953 |
| 2,728,177 | Holstebroe | Dec. 27, 1955 |
| 2,739,430 | Griswold | Mar. 27, 1956 |
| 2,747,348 | Rose | May 29, 1956 |
| 2,832,182 | McGihon | Apr. 29, 1958 |
| 2,896,382 | Back | July 28, 1959 |
| 2,906,075 | Vogel | Sept. 29, 1959 |

UNITED STATES PATENT OFFICE
CERTIFICATION OF CORRECTION

Patent No. 3,015,923 January 9, 1962

Paul N. Dotzenroth

It is hereby certified that error appears in the above numbered patent requiring correction and that the said Letters Patent should read as corrected below.

Column 4, line 60, for "side" read -- sides --; column 6, line 34, for "inside" read -- in side --; column 8, line 7, for "framed" read -- frame --; line 17, for "wrappers" read -- wrapper --; line 24, for "strip" read -- strips --; line 26, for "ar" read -- are --; line 44, for "valves" read -- valve --; line 54, after "yoke" strike out "line"; column 11, line 10, for "bevelod" read -- beveled --; line 25, after "sides" insert -- of --; line 26, after "are," insert -- of --; column 12, line 70, for "whereupn" read -- whereupon --; column 13, line 49, for "agle" read -- angle --; column 16, line 34, for "flap-holding" read -- flap-folding --.

Signed and sealed this 12th day of June 1962.

(SEAL)
Attest:

ERNEST W. SWIDER
Attesting Officer

DAVID L. LADD
Commissioner of Patents